United States Patent
Sugiyama

(10) Patent No.: US 7,828,379 B2
(45) Date of Patent: Nov. 9, 2010

(54) VEHICLE SEAT WITH SYSTEM FOR FACILITATING RELIEVING OF FATIGUE OF PERSON SITTING ON THE SEAT

(75) Inventor: Shinji Sugiyama, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 188 days.

(21) Appl. No.: 12/273,855

(22) Filed: Nov. 19, 2008

(65) Prior Publication Data
US 2009/0236883 A1 Sep. 24, 2009

(30) Foreign Application Priority Data
Nov. 19, 2007 (JP) ............................. 2007-299194

(51) Int. Cl.
*A47C 31/00* (2006.01)

(52) U.S. Cl. ............... 297/217.3; 297/284.6; 297/284.8; 297/284.9; 297/284.4; 340/691.6; 340/440; 340/669; 280/735

(58) Field of Classification Search ............. 297/217.3, 297/284.8, 284.6, 284.9, 284.4; 340/691.6, 340/440, 669; 280/735
See application file for complete search history.

(56) References Cited

U.S. PATENT DOCUMENTS

| | | | | |
|---|---|---|---|---|
| 5,129,704 A | * | 7/1992 | Kishi et al. | 297/284.1 |
| 5,707,109 A | * | 1/1998 | Massara et al. | 297/284.9 |
| 5,925,084 A | * | 7/1999 | Gotoh et al. | 701/45 |
| 6,037,731 A | * | 3/2000 | Fruehauf et al. | 318/468 |
| 6,055,473 A | * | 4/2000 | Zwolinski et al. | 701/49 |
| 6,629,715 B2 | * | 10/2003 | Oh et al. | 296/63 |
| 6,683,430 B2 | * | 1/2004 | Pavlov et al. | 318/466 |
| 6,873,892 B2 | * | 3/2005 | Katz et al. | 701/49 |
| 7,068,178 B2 | * | 6/2006 | Oh | 340/667 |
| 7,422,285 B2 | * | 9/2008 | Phipps | 297/284.1 |
| 7,566,096 B2 | * | 7/2009 | Phipps | 297/217.3 |
| 2005/0127728 A1 | * | 6/2005 | Sugiyama et al. | 297/284.3 |

FOREIGN PATENT DOCUMENTS

| | | |
|---|---|---|
| JP | 9240399 | 9/1997 |
| JP | 11278129 | 10/1999 |
| WO | 2007094492 | 8/2007 |

* cited by examiner

*Primary Examiner*—Laurie K Cranmer
(74) *Attorney, Agent, or Firm*—Dann, Dorfman, Herrell and Skillman, P.C.

(57) ABSTRACT

There is disclosed a vehicle seat provided with a system for facilitating relieving of fatigue of an occupant on the vehicle seat, the vehicle seat including a seat back, the system comprising an occupant's body-motion promoting means 6 provided in an interior of the seat back 1 for repeatedly locally pressing the occupant on the vehicle seat, to thereby promote blood circulation of the occupant, a lateral acceleration sensor 8 provided in the interior of the seat back 1 for detecting accelerations that are applied in right and left lateral directions relative to a vehicle, and an acceleration-distinction control circuit provided in the interior of the seat back 1 for causing the body-motion promoting means 6 to be maintained in a drivable state according when an acceleration detected by the lateral acceleration sensor 8 is in a predetermined value range, for causing drive of the body-motion promoting means to be once stopped when the lateral acceleration becomes an excessive value exceeding an upper limit of the predetermined value range during the drive of the body-motion promoting means, and for returning the body-motion promoting means to the drivable state when the lateral acceleration drops toward the predetermined value range from the excessive value.

3 Claims, 3 Drawing Sheets

VEHICLE SEAT WITH SYSTEM FOR FACILITATING RELIEVING OF FATIGUE OF PERSON SITTING ON THE SEAT

BACKGROUND OF THE INVENTION

1. Field of the Invention

The present invention relates to a vehicle seat which is provided with a system for facilitating promoting of blood circulation in an occupant sitting on the vehicle seat for many hours, thereby facilitating relieving of fatigue of the occupant.

2. Description of the Related Art

There has been proposed a vehicle seat with fatigue reduction function, the vehicle seat having an occupant's body-motion promoting means provided in an interior of a seat back thereof (WO2007/094492). The occupant's body-motion promoting means is configured to intermittently perform repeated pressing/releasing operations with respect to the third lumbar vertebrae of an occupant on the seat times in a range of three to seven times, at a stroke amount in a range of 10 mm to 20 mm, and at a time interval of 5 minutes to 10 minutes.

The occupant's body-motion promoting means is provided as means to locally press the occupant on the seat under the above conditions. However, in the vehicle seat of the related art, when a vehicle in which the seat is employed is subjected to excessive acceleration applied laterally during travelling of the vehicle (hereinafter referred to as "lateral acceleration") under a situation where a driver on the seat is repeatedly pressed locally by the occupant's body-motion promoting means, the driver is subjected to repeated pressure exerted by the body-motion promoting means and the lateral acceleration, so that it is feared that the upper body of the driver will become unstable, thus giving the driver an uncomfortable sitting feeling.

In the past, there was known a vehicle seat which is provided with a posture holding means in which a shape, hardness, etc. of a side air bag are adapted to be controlled by a lateral acceleration sensor in order to enhance lateral support of an occupant on the seat against excessive lateral acceleration (Japanese Patent Application Laid-Open Nos. H09-240399 and H11-278129).

SUMMARY OF THE INVENTION

It is an object of the present invention to provide a vehicle seat with fatigue reduction function which is provided with an occupant's body-motion promoting means for repeatedly locally pressing an occupant on the seat, to thereby promote blood circulation of the occupant, in which when excessive lateral acceleration is applied to a vehicle, in which the seat is employed, during travelling of the vehicle and drive of the occupant's body-motion promoting means, the occupant's body-motion promoting means is adapted to be controlled so as to be drive-stopped.

In accordance with the present invention, there is provided a vehicle seat provided with a system for facilitating relieving of fatigue of an occupant sitting on the vehicle seat, the vehicle seat including a seat back. The system comprises an occupant's body-motion promoting means provided in an interior of the seat back for repeatedly locally pressing the occupant on the vehicle seat, to thereby promote blood circulation of the occupant, a lateral acceleration sensor provided in the interior of the seat back for detecting accelerations that are applied in right and left lateral directions relative to a vehicle, and an acceleration-distinction control circuit provided in the interior of the seat back for causing the body-motion promoting means to be maintained in a drivable state when an acceleration detected by the lateral acceleration sensor is in a predetermined value range, for causing drive of the body-motion promoting means to be once stopped when the lateral acceleration becomes an excessive value exceeding an upper limit of the predetermined value range during the drive of the body-motion promoting means, and for returning the body-motion promoting means to the drivable state when the lateral acceleration drops toward the predetermined value range from the excessive value.

In the vehicle seat according to the present invention, when excessive lateral acceleration is applied to the vehicle under the situation where a local part of an occupant's body is repeatedly pressed by the occupant's body-motion promoting means, the occupant's body-motion promoting means is once drive-stopped, so that the upper body of the occupant can be maintained stable and an uncomfortable sitting feel is not given to the occupant. Moreover, the occupant's body-motion promoting means and the lateral acceleration sensor are provided in the interior of the seat back and the lateral acceleration sensor detects the lateral accelerations, so that the occupant's body-motion promoting means can be drive-controlled with a simple control system.

The acceleration-distinction control circuit may be configured so as to judge the accelerations on the basis of variation in a voltage value, according to the accelerations detected by the lateral acceleration sensor.

In the configuration discussed above, the acceleration-distinction control circuit is configured so as to judge the accelerations applied in the right and left lateral directions, on the basis of the variation in the voltage value. Therefore, it is unnecessary to discriminate the accelerations separately, thus making it possible to drive-control the occupant's body-motion promoting means with a more simpler control system.

The lateral acceleration sensor may be provided in the interior of the seat back so as to be arranged at a position positionally corresponding to the ninth thoracic vertebrae of the occupant on the vehicle seat.

In the configuration discussed above, the lateral acceleration is arranged at the position positionally corresponding to the ninth thoracic vertebrae of the occupant on the vehicle seat which is easy to be inclined according to the acceleration applied in the right and left lateral directions relative to the vehicle, so that it is possible to precisely detect the motion of the occupant on the seat.

DETAILED DESCRIPTION OF THE PREFERRED EMBODIMENT

Figure 1:
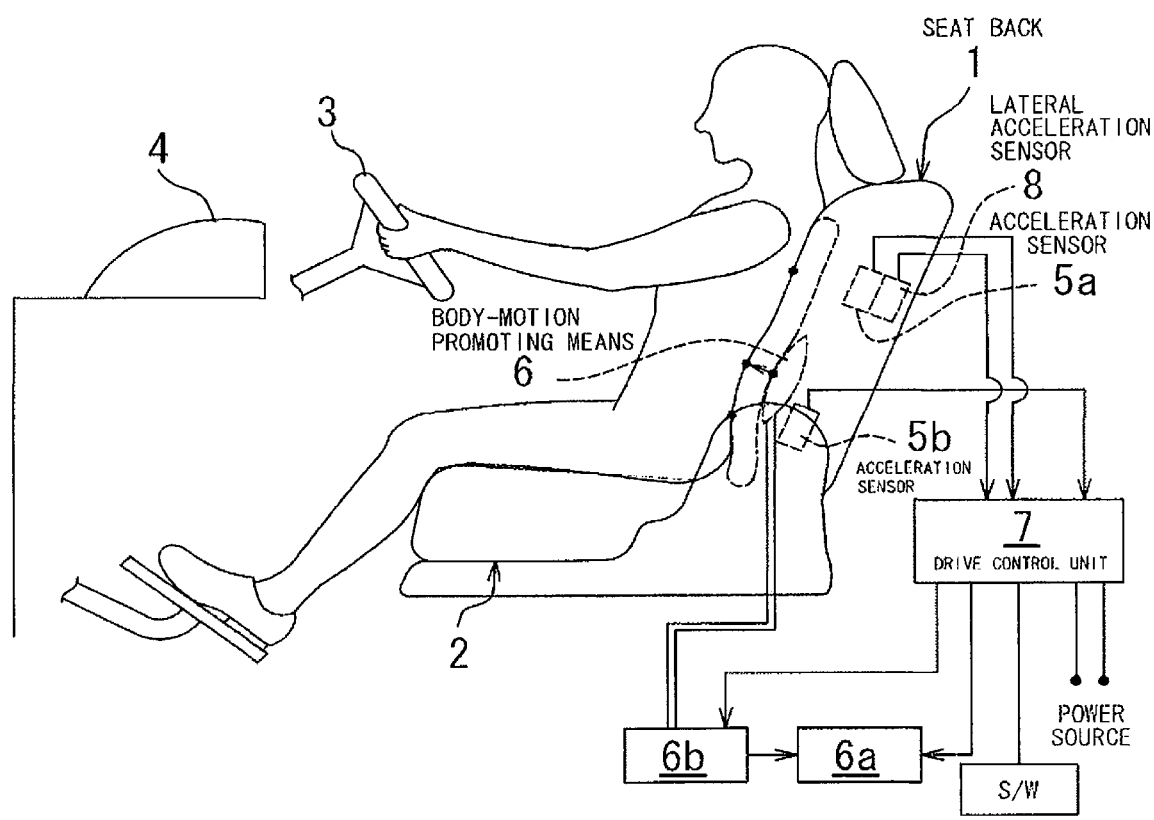
FIG. 1 is an explanatory view showing a vehicle seat with fatigue reduction function according to the present invention.

Referring to FIG. 1, there is illustrated a driver's seat for a vehicle according to an embodiment of the present invention, which is provided with a system for facilitating relieving of fatigue of a driver sitting on the seat during travelling of the vehicle. In FIG. 1, reference numeral 1 denotes a seat back of the driver's seat, reference numeral 2 designates a seat cushion of the driver's seat, reference numeral 3 denotes a steering wheel, and reference numeral 4 designates an instrument panel. The driver's seat includes acceleration sensors 5a, 5b provided in the seat back 1 for detecting angles of the ninth thoracic vertebrae and pelvis region of the occupant on the seat in order to detect an amount of variation in an angle of the pelvis of the occupant during the travelling of the vehicle, and an occupant's body-motion promoting means 6 provided in the seat back 1 for repeatedly locally pressing the occupant sitting on the vehicle seat during the travelling of the vehicle, to thereby promote blood circulation of the occupant. The acceleration sensors 5a, 5b are electrically connected to a drive control unit 7.

The body-motion promoting means 6 includes an air bag which is inflatable and deflatable by supplying air to the air bag and sucking air from the air bag and serves as means for repeatedly pressing the third lumbar vertebrae of the occupant. The body-motion promoting means 6 is connected to an air pump 6a through an electromagnetic valve 6b. The air pump 6a and the electromagnetic valve 6b are electrically connected to the drive control unit 7. The air bag is provided in a cushioned padding of the seat back 1 so as to be arranged at a position positionally corresponding to the third lumbar vertebrae of the occupant sitting on the seat.

The body-motion promoting means 6 is configured so as to be also drive-controlled by a lateral acceleration sensor 8 which is electrically connected to the drive control unit 7. As the lateral acceleration sensor 8, there may be employed a lateral acceleration sensor which is configured such that it detects lateral acceleration applied to the vehicle during the travelling of the vehicle and then outputs a voltage value. The lateral acceleration sensor 8 is provided within the seat back 1 so as to be arranged at a position positionally corresponding to the ninth thoracic vertebrae of the occupant on the seat and adjacent the acceleration sensor 5a, in order that the occupant's body-motion can be precisely detected.

The drive control unit 7 includes a program circuit for calculating the amount of the variation in the angle of the pelvis of the occupant which is detected through the acceleration sensors 5a, 5b, a sequencer, and a drive control circuit for the occupant's body-motion promoting means 6. When it is detected through the acceleration sensors 5a, 5b that the angle of the pelvis of the occupant on the seat reaches a simulatively set value according to the motion of the occupant's body which occurs during the travelling of the vehicle for many hours, a command based upon a detection value obtained by the acceleration sensors 5a, 5b is inputted to the sequencer which then causes the air pump 6a to be actuated, and supplying of air to the air bag and sucking of air from the air bag are controlled by the electromagnetic valve 6b.

The drive control unit 7 further includes a lateral acceleration-distinction control circuit for causing the body-motion promoting means 6 to be maintained in a drivable state according to a command from the lateral acceleration sensor 8 when an acceleration detected by the lateral acceleration sensor 8 is in a predetermined value range, for causing drive of the body-motion promoting means to be once stopped when the lateral acceleration becomes an excessive value exceeding an upper limit of the predetermined value range during the drive of the body-motion promoting means, and for returning the body-motion promoting means to the drivable state when the lateral acceleration drops toward the predetermined value range from the excessive value. The entire drive control unit 7 may be provided at a side section of a seat back frame for the seat back 1.

Figure 2:
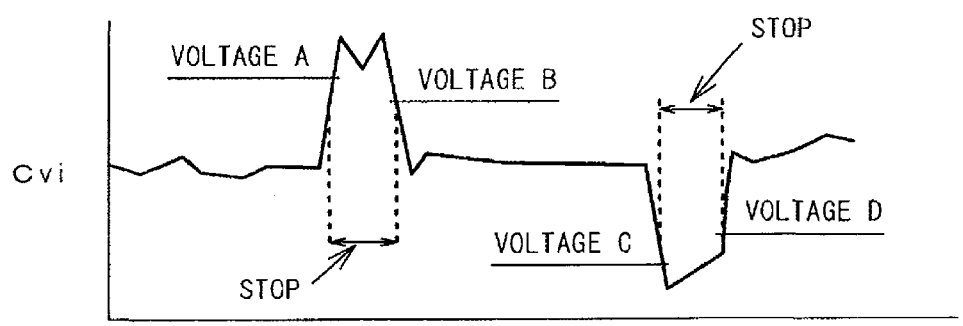
FIG. 2 is a graph which is of assistance in explaining a process for discriminating accelerations on the basis of voltage values and controlling a body-motion promoting means which is provided at the vehicle seat shown in FIG. 1.
Figure 3:
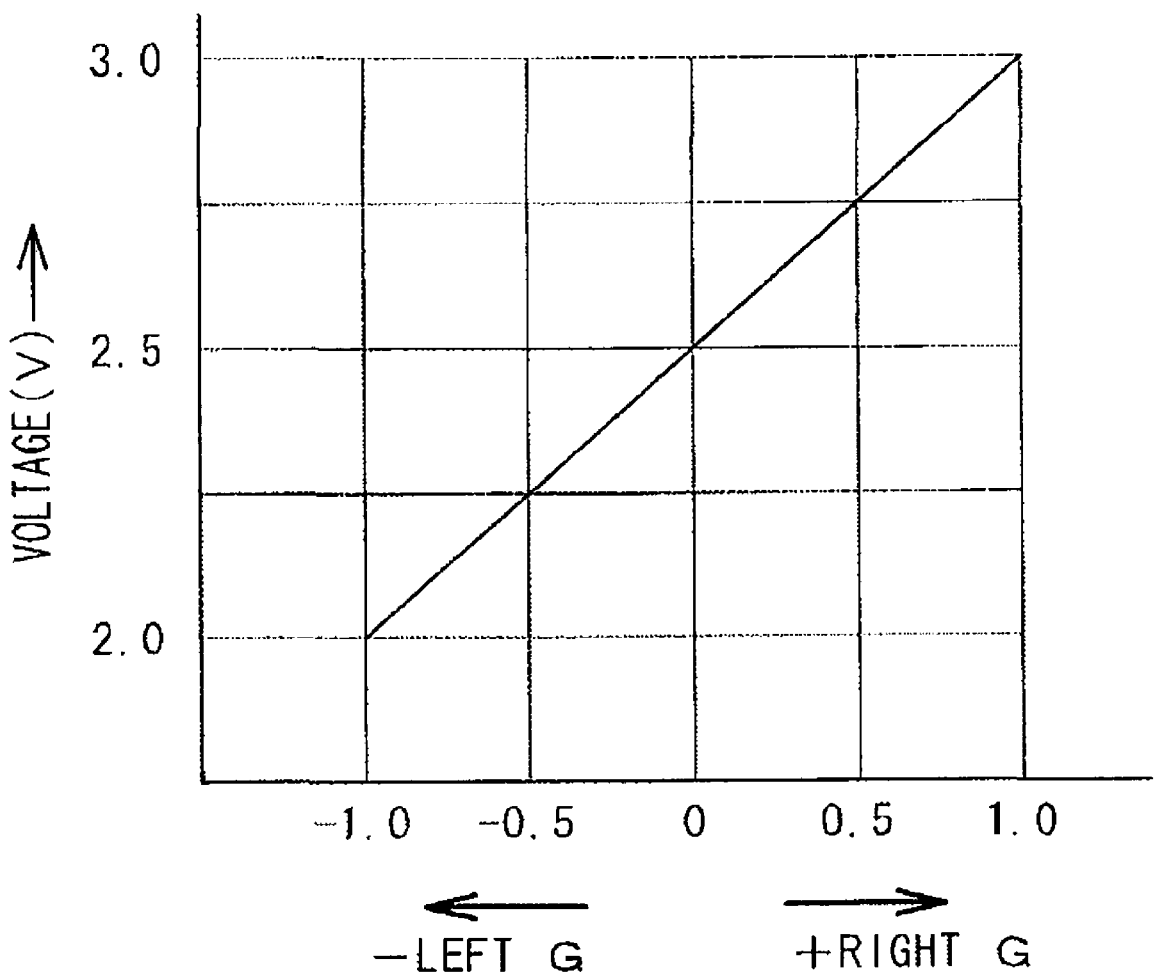
FIG. 3 is a graph which is of assistance in explaining a process for discriminating right and left lateral accelerations on the basis of the voltage values.

As the lateral acceleration-distinction control circuit, there is employed a lateral acceleration-distinction control circuit which judges accelerations, applied in left and right lateral directions relative to the vehicle, as variation in the voltage value, on the basis of the accelerations detected by the lateral acceleration sensor 8, as shown in FIGS. 2 and 3. Moreover, in the illustrated example, right lateral acceleration is set as a plus voltage value and left lateral acceleration is set as a minus voltage value. Thus, it is possible to discriminate the accelerations applied in the left and right lateral directions relative to the vehicle.

A description will be given hereinafter of, for example, the right lateral acceleration. In a case where an output which corresponds to normal acceleration (Cvi) shown in FIG. 2 is set in a predetermined value range of 2.4-2.6V; when the voltage value is in the predetermined value range of 2.4-2.6V, the body-motion promoting means 6 is maintained in a drivable state; when the voltage value exceeds 2.6V, the body-motion promoting means 6 is once stopped; and when the voltage value drops to 2.55V, the body-motion promoting means 6 is returned to the drivable state. In this way, the body-motion promoting means 6 can be controlled.

Referring to FIG. 3, in the illustrated embodiment, when the voltage value is 2.5V, the acceleration G is set to zero (±0 G); when the voltage value is 3.0V, the acceleration G is set to +1.0 (right 1.0 G); and when the voltage value is 2.0V, the acceleration G is set to −1.0 (left 1.0 G). Thus, it is possible to make judgment based on the high and low voltages that are outputted from the lateral acceleration sensor 8. Detection information from the lateral acceleration sensor 8 is taken in real time by the acceleration-distinction control circuit.

Figure 4:
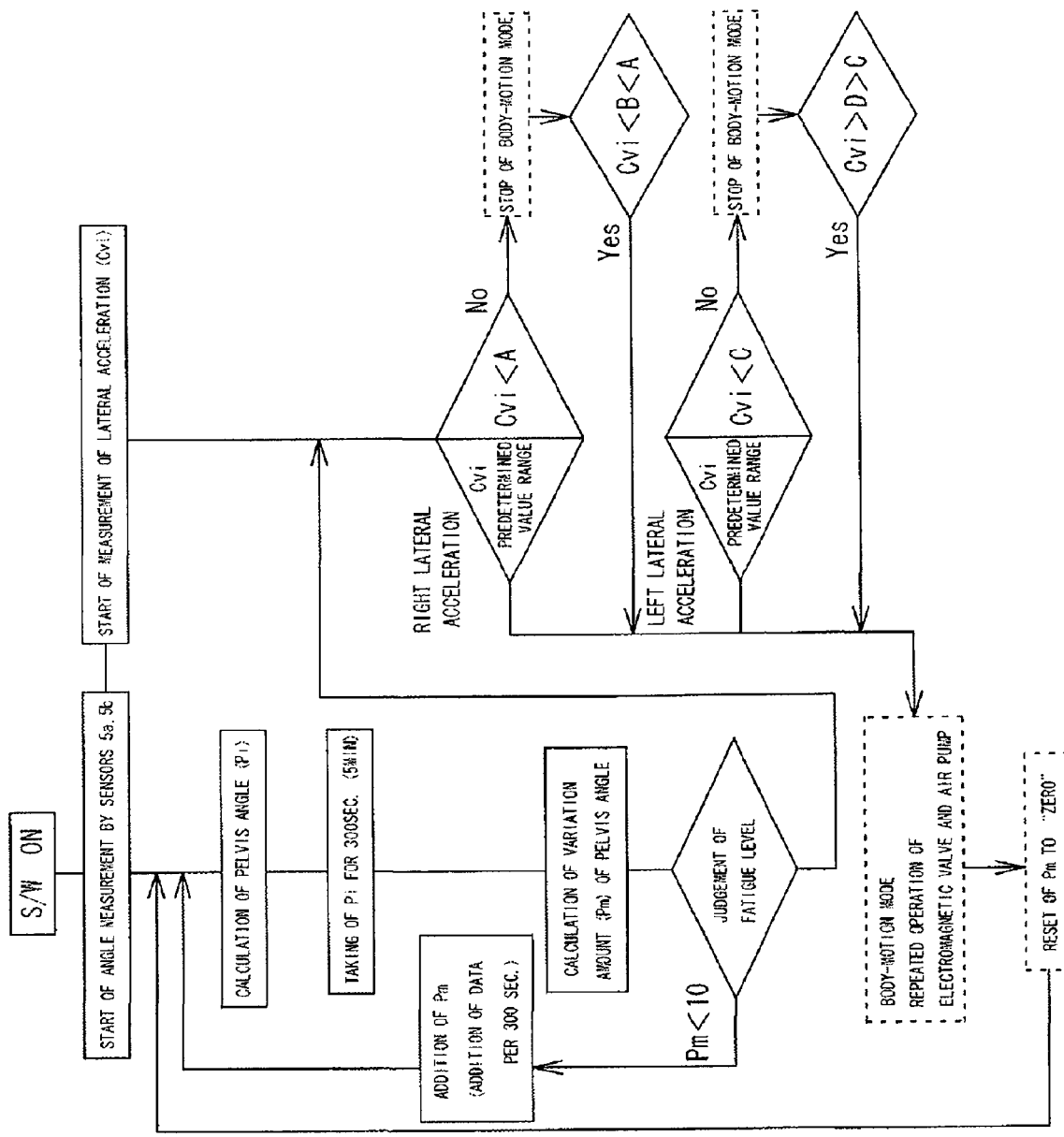
FIG. 4 is a flow chart which is of assistance in explaining the operation of a drive control unit for the body-motion promoting means provided at the vehicle seat of FIG. 1.

Referring to FIGS. 2 and 4, the operation of the drive control unit will be discussed hereinafter. FIG. 4 schematically illustrates a flow chart for the operation of the drive control unit. When an operation switch (SAN) is turned ON, the acceleration sensors 5a, 5b start the measurement of the angle and the lateral acceleration sensor 8 simultaneously starts the measurement of the lateral acceleration (Cvi). According to the angle measurement by the acceleration sensors 5a, 5b, the angle (Pi) of the pelvis of the occupant is calculated and taken for 300 sec. (5 min.). Then, an amount (Pm) of variation in the pelvis angle (Pi) taken for 300 sec. (5 min.) is calculated.

It is judged whether or not the amount (Pm) of the variation in the pelvis angle has reached a predetermined value. In a case where the predetermined value is, for example, 10, unless the amount (Pm) reaches the level 10 (Pm<10), addition of the amount (Pm) of the variation in the pelvis angle is performed per 300 sec and a value obtained by the addition is fed back, as accumulated fatigue data, to the stage calculating the pelvis angle.

On the other hand, when it is judged that the amount (Pm) of the variation in the pelvis angle has reached the level 10 (10≦Pm), a command is sent to a stage measuring the lateral acceleration. Then, it is judged whether or not the lateral acceleration at this time has been in the predetermined value range and, thereafter, it is determined whether the body-motion promoting means 6 should be driven or drive-stopped.

When it is judged that, at this time, the right lateral acceleration and the left lateral acceleration are in the predetermined value range, the air pump 6a and electromagnetic valve 6b of the body-motion promoting means 6 are repeatedly operated and a body-motion mode by the air bag is set. After the passage of a predetermined time of the body-motion mode, the amount (Pm) of the variation in the pelvis angle is reset and the process is returned to the initial stage calculating the pelvis angle.

On the other hand, when it is judged that the right lateral acceleration or the left lateral acceleration has exceeded an upper limit of the predetermined value range during the body-motion mode by the air bag, the body-motion mode by the air bag is once stopped. Referring to the flow chart shown in FIG. 4, first of all, when it is judged that the right lateral acceleration has exceeded the upper limit of the predetermined value range (Cvi<A), the body-motion mode by the air bag is immediately stopped once. If the right lateral acceleration drops to a voltage value B between the excessive voltage value A and the predetermined value range (Cvi<B<A), the body-motion mode by the air bag is set so as to be able to be resumed.

Even if the right lateral acceleration is in the predetermined value range, when it is judged that the left lateral acceleration has exceeded the upper limit of the predetermined value range (Cvi<C), the body-motion mode by the air bag is immediately stopped once in the same manner as discussed above. When the left lateral acceleration drops to a voltage value D between the excessive voltage value C and the predetermined value range (Cvi<D<C), the body-motion mode by the air bag is set so as to be able to be resumed. Incidentally, the processing order of the right and left lateral accelerations is not limited to the above case.

In the vehicle seat with the fatigue reduction function, which is configured as discussed above, when the excessive lateral acceleration is applied to the vehicle under the situation where, with the body-motion mode by the air bag, the local part of the occupant's body is repeatedly pressed, the body-motion mode by the air bag is once drive-stopped, so that the upper body of the driver sitting on the vehicle seat can be kept stable.

While the case where the acceleration sensors 5a, 5b for detecting the amount in the variation of the pelvis angle as a fatigue degree of the occupant are employed in the above-mentioned embodiment has been discussed above, a detecting means for measuring a fatigue degree of the driver from perspiration of the hands of the driver driving the vehicle while grasping the steering wheel and sitting on the vehicle seat may be employed.

What is claimed is:

1. A vehicle seat provided with a system for facilitating relieving of fatigue of an occupant sitting on the vehicle seat, the vehicle seat including a seat back;
   the system comprising:
   an occupant's body-motion promoting means provided in an interior of the seat back for repeatedly locally pressing the occupant on the vehicle seat, to thereby promote blood circulation of the occupant;
   a lateral acceleration sensor provided in the interior of the seat back for detecting accelerations that are applied in right and left lateral directions relative to a vehicle; and
   an acceleration-distinction control circuit provided in the interior of the seat back for causing the body-motion promoting means to be maintained in a drivable state when an acceleration detected by the lateral acceleration sensor is in a predetermined value range, for causing drive of the body-motion promoting means to be once stopped when the lateral acceleration becomes an excessive value exceeding an upper limit of the predetermined value range during the drive of the body-motion promoting means, and for returning the body-motion promoting means to the drivable state when the lateral acceleration drops toward the predetermined value range from the excessive value.

2. A vehicle seat according to claim 1, wherein the acceleration-distinction control circuit is configured so as to judge the accelerations on the basis of variation in a voltage value, according to the accelerations detected by the lateral acceleration sensor.

3. A vehicle seat according to claim 1 or 2, wherein the lateral acceleration sensor is provided in the interior of the seat back so as to be arranged at a position positionally corresponding to the ninth thoracic vertebrae of the occupant on the vehicle seat.

* * * * *